(12) United States Patent
Spaulding et al.

(10) Patent No.: US 12,451,144 B2
(45) Date of Patent: Oct. 21, 2025

(54) AUTHENTICATION USING WORDS AS A SINGLE-USE PASSCODE

(71) Applicant: Oracle International Corporation, Redwood Shores, CA (US)

(72) Inventors: Kent Arthur Spaulding, Portland, OR (US); Kenneth Joseph Meltsner, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 352 days.

(21) Appl. No.: 18/159,514

(22) Filed: Jan. 25, 2023

(65) Prior Publication Data

US 2024/0249730 A1 Jul. 25, 2024

(51) Int. Cl.
*H04L 9/40* (2022.01)
*G10L 17/24* (2013.01)

(52) U.S. Cl.
CPC .......... *G10L 17/24* (2013.01); *H04L 63/0838* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 8,812,319 B2 | 8/2014 | Skerpac | |
| 9,015,795 B2 | 4/2015 | B'Far et al. | |
| 9,390,445 B2 | 7/2016 | Sheets et al. | |
| 9,870,461 B2 | 1/2018 | Akula et al. | |
| 2003/0163739 A1* | 8/2003 | Armington | H04L 9/3226 713/186 |
| 2005/0071168 A1 | 3/2005 | Juang et al. | |
| 2006/0178885 A1 | 8/2006 | Tavares | |
| 2007/0186099 A1 | 8/2007 | Beck et al. | |
| 2008/0250477 A1* | 10/2008 | Samuelsson | G06F 21/40 726/4 |
| 2010/0165981 A1* | 7/2010 | Kuppuswamy | H04M 3/38 704/E11.001 |
| 2010/0299143 A1 | 11/2010 | Takeda et al. | |

(Continued)

FOREIGN PATENT DOCUMENTS

| | | |
|---|---|---|
| CN | 108346426 A | 7/2018 |
| EP | 3790001 A1 | 3/2021 |

(Continued)

OTHER PUBLICATIONS

"A Practical and Secure Password and Passphrase Generator", Retrieved from https://pthree.org/2017/09/04/a-practical-and-secure-password-and-passphrase-generator/, Sep. 4, 2017, pp. 5.

(Continued)

*Primary Examiner* — Quynh H Nguyen
(74) *Attorney, Agent, or Firm* — Invoke (57) ABSTRACT

The present disclosure provide a multiple factor authentication process using text passcodes. A process performs a first verification of a user using an authentication credential transmitted via a first communication channel. Based on successfully performing the first verification, the process performs a second verification using a word or a textual phrase transmitted to the user via a different communication channel. The word or textual phrase can be a single-use, limited-time token provided as text or audio.

20 Claims, 4 Drawing Sheets

(56) References Cited

U.S. PATENT DOCUMENTS

| | | | |
|---|---|---|---|
| 2012/0254964 A1 | 10/2012 | Kumar et al. | |
| 2014/0188468 A1 | 7/2014 | Dyrmovskiy et al. | |
| 2016/0065559 A1* | 3/2016 | Archer | H04L 63/0861 726/8 |
| 2020/0112560 A1* | 4/2020 | Hunt | G06F 21/31 |
| 2020/0193009 A1 | 6/2020 | Shafet et al. | |
| 2021/0074273 A1 | 3/2021 | Niu et al. | |
| 2022/0310100 A1 | 9/2022 | Saund et al. | |

FOREIGN PATENT DOCUMENTS

| | | |
|---|---|---|
| JP | 2006-235623 A | 9/2006 |
| WO | 2005/119653 A1 | 12/2005 |
| WO | 2018/102462 A2 | 6/2018 |

OTHER PUBLICATIONS

"Use A Passphrase", Retrieved from https://www.useapassphrase.com/, Retrieved on Nov. 14, 2022, pp. 6.

Kate R., "The logic behind three random words", Retrieved from https://www.ncsc.gov.uk/blog-post/the-logic-behind-three-random-words, Aug. 6, 2021, pp. 5.

Liu et al., "Error-Driven Pronunciation Dictionary Construction for Mandarin Speech Recognition", 2014 9th International Symposium on Chinese Spoken Language Processing (ISCSLP), 2014, pp. 88-92.

Skillen et al., "Myphrase: Passwords from Your Own Words", Jan. 24, 2013, pp. 22.

Yamagishi et al., "AssociPass: A User Authentication System with Word-Pairs for Security against Guess Attack", Apr. 2018, pp. 7.

* cited by examiner

AUTHENTICATION USING WORDS AS A SINGLE-USE PASSCODE

TECHNICAL FIELD

The present disclosure relates to authenticating identities of individuals and, more specifically, to two-factor authentication using multiple communication channels and biometrics.

BACKGROUND

Authenticating identities of users attempting to access protected computing resources is important in many contexts. A common issue with conventional authentication techniques is the tradeoff between security and usability. For example, passwords are difficult to memorize. As a result, individuals often choose weak passwords that are easily cracked. On the other hand, strong passwords may be difficult to crack but are also difficult to remember. As a consequence, individuals may insecurely record passwords, which risks their theft and misuse. Accordingly, relying solely on passwords is an imperfect authentication measure.

Two-factor authentication can improve the security of system using passwords or other such tokens for use-authentication. Two-factor authentication requires an individual to provide two unique and distinct identifiers. For example, a first factor can be a password possessed by an individual and transmitted to an authentication system for verification via the Internet. A second factor can be a challenge, such as a CAPTCHA, or a single-use, time-limited numeric passcode transmitted to the individual via a telephone network. The individual can then verify their identity by transmitting a challenge-response or the numeric passcode to the authentication system for verification within a limited time period. Numeric passcodes, however, suffer from the similar issues of security and usability as passwords. For example, six digit numeric passcodes are difficult for many people to hold in their memories for more than a short period of time.

The approaches described in this Background section are ones that could be pursued, but not necessarily approaches that have been previously conceived or pursued. Unless otherwise indicated, it should not be assumed that any of the approaches described in this section qualify as prior art.

BRIEF DESCRIPTION OF THE DRAWINGS

The embodiments are illustrated by way of example and not by way of limitation in the figures of the accompanying drawings. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in different embodiments. In some examples, well-known structures and devices are described with reference to a block diagram in order to avoid unnecessarily obscuring the present invention.

The embodiments are illustrated by way of example and not by way of limitation in the figures of the accompanying drawings. It should be noted that references to "an" or "one" embodiment in this disclosure are not necessarily to the same embodiment, and they mean at least one.

This Detailed Description section includes the following subsections:

A. GENERAL OVERVIEW
B. SYSTEM ENVIRONMENT
C. SYSTEM ARCHITECTURE
D. MULTIPLE FACTOR AUTHENTICATION
E. MISCELLANEOUS; EXTENSIONS
F. HARDWARE OVERVIEW

A. General Overview

One or more embodiments implement an authentication process using multiple factors. The process may be implemented using any of a set of communication channels including, but not limited to, email, text messaging, instant messaging, and phone calls. The system performs a first verification of a user using an authentication credential transmitted by the user via a first communication channel. Based on successfully performing the first verification, the process performs a second verification using a word or a textual phrase. The system transmits the word or textual phrase to the user via a same or different communication channel than that used to receive the authentication credential used for the first verification. The word or textual phrase can be a single-use, limited-time token provided as text or audio. The system requests the user to provide audio input that vocalizes the word or textual phrase that has been transmitted to the user. The system receives audio input that includes the word or textual phrase as spoken by the user. The system converts the spoken word or textual phrase into text, and verifies that the converted text matches or substantially matches the text transmitted to the user. Additionally, one or more embodiments verify the user's spoken word or textual phrase by performing voice-matching with a voice print of the user. In some embodiments, the word or textual phrase transmitted to the user via a first communication channel may be requested back from the user via a second communication channel. Responsive to successfully completing the verifications, the system authorizes the user access to a resource.

One or more embodiments disclosed herein improve existing computing systems by using words and textual phrases as single-use authentication codes, which makes the authentication codes memorable and repeatable for users. Words and textual phrases with an associated meaning may be, for some users, more memorable than a meaningless sequence of digits. Additionally, using words and textual phrases as authentication codes improve on existing computing systems by generating authentication codes that are usable by individuals with visual impairment and short-term memory loss. Furthermore, using words and textual phrases as authentication codes improve on existing computing systems by matching spoken words or textual phrases to user voice prints to verify that users are known individuals, rather than fraudsters or computer-generated entities.

While this General Overview subsection describes various example embodiments, it should be understood that one or more embodiments described in this Specification or recited in the claims may not be included in this subsection.

B. System Environment

Figure 1:
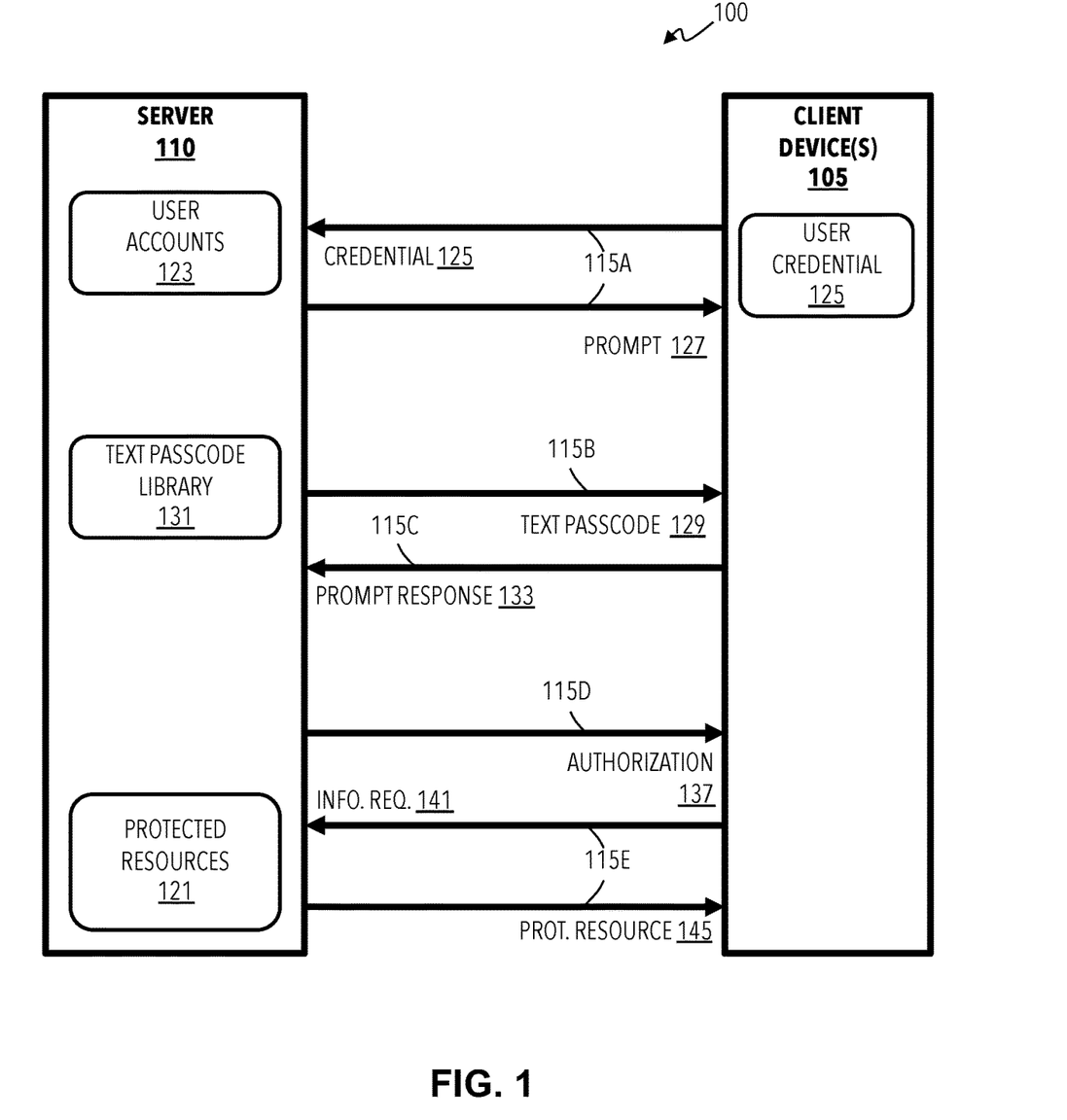
FIG. 1 illustrates a functional flow block diagram of an example system in accordance with one or more embodiments.

FIG. 1 shows a system block diagram illustrating an example computing environment 100 for implementing systems and processes in accordance with one or more embodiments. The computing environment 100 includes one or more client device(s) 105 and a server 110. The client devices 105 can be computing systems communicatively connected, directly or indirectly, to the server 110 via two or more different communication channels 115A, 115B, 115C, 115D, and 115E.

A client device 105 can be one or more computing devices allowing a user to access and interact with the server 110. The client device 105 can be a personal computer system, a smartphone, a tablet computer, a laptop computer, or other programmable user computing device. The client device 105 can include one or more processors that process software or other computer-readable program instructions and include a memory to store the software, computer-readable program instructions, and data. The data can include a user credential 125, such as a password, a biometric input (e.g., fingerprint or facial recognition), random token, or the like. The client device 105 can also include a communication device that can communicate with server 110 via the communication channels 115. Additionally, the client device 105 can generate a computer-user interface enabling a user to interact with the client device 105 and the server 110 using input/output devices (e.g., keyboard, pointer device, touchscreen, microphone, and speaker). For example, client device 105 can execute a web browser application that generates an interactive user interface (e.g., a graphic user interface) with which a user can interact with an authentication process of the server 110 to verify the identity of the user and request one or more protected resources 121.

The server 110 can be one or more computing systems that selectively authorize access to the protected resources 121. The server 110 can be one or more server computers, personal computers, or other programmable user computing devices. As discussed below, the server can include one or more processors that execute computer-readable instructions configuring the server 110 execute an authorization process that verifies the identity of a user of the client device 105 for accessing the protected resources 121 based on user account information 123. The protected resources 121 can be any type of data file or a collection of data files. For example, the protected resources 121 can be account information, audio and/or visual media files, text media files, documents, data files, software, etc.

The communication channels 115A, 115B, 115C, 115D, and 115E can include wired or wireless data links and/or a communication networks, such as local area networks, peer-to-peer networks, wide area networks, telephone networks, and the Internet. One or more of embodiments of the client device 105 communicate with the server 110 through at least two different communications channels comprising the communication channels 115. For example, the first communication channel can be the Internet and a second communication channel can be a cellular telephone network.

As an example, the server 110 can be an authorization system of a streaming video service at which the user has a user account. The protected resources 121 can be an audio-visual media files available to customers of the streaming video service. The server 110 can authorize a user of the client device 105 to access the protected resources 121. The client device 105 can be a smart phone executing a mobile Web browser or application that establishes a connection with the server 110 via an Internet communication channel 115A. As illustrated in FIG. 1, using the client device 105, the user can transmit a credential 125 to the server 110 via the Internet communication channel 115A. The credential 125 can be a username and a password. The server 110 can verify the received credential 125 using information of the user stored in the user accounts 123.

In response to successfully verifying of the credential 125, the server 110 can transmit a prompt 127 to the client device 105 requesting the user provide an authentication token. In some implementations, the server 110 can transmit the prompt 127 using the Internet communication channel 115A. Alternatively, the server 110 can transmit the prompt 127 using a telephonic communication channel 115B. For example, the server 110 can transmit the prompt 127 using a text messaging protocol (e.g., using the Short Message Service (SMS)) or a multimedia messaging protocol (e.g., Multimedia Messaging Service (MMS)). While FIG. 1 illustrates the prompt being sent to the same client device 105 that transmitted the credential 125, some embodiments can send the prompt 127 to a second client device 105 of the user. For example, where the client device 105 transmitting the credential 125 is the user's smartphone, the second client device 105 can be the user's tablet computer or personal computer.

In addition to the prompt 127, the server 110 can generate and transmit a challenge or a text passcode 129 from a text passcode library 131 to the user for responding to the prompt 127. The challenge or the text passcode 129 can be provided to the user as text or as audio using a communication channel 115B, which is different than the communication channel 115A used for receiving the credential 125. For example, the text passcode 129 can be a textual phrase, such as "brown bears," which can be presented to the user as text and/or audio at the client device 105.

Using input/output devices of the client device 105, the user can input the text passcode 129 in response to the prompt 127 and transmit a prompt response 133 to the server 110. For example, the user can speak the textual phrase using a microphone of the client device 105 and then trigger transmission of the prompt response 133. The server 110 can receive the prompt response 133 from the client device 105 and verify spoken phrase is the voice of the user by voice matching the received prompt response 133 to a voice print of the user in the user accounts 123. Further, the server 110 can process the spoken phrase using voice recognition techniques to translate the spoken phrase to text. Using the text obtained from the translation, the server 110 can verify that the text at least substantially matches the text passcode 129 transmitted to the user. For example, the server 110 may verify that the prompt response 133 matches the text passcode 129, or that the prompt response 133 is a near miss or homonym of the text passcode 129. For example, if the text passcode 129 is "brown bears," the server 110 may accept alternative outputs from the speech-to-text-conversion, such as: "brown bear" and "brow bears."

Based on successfully verifying the prompt response 133, the server 110 can communicate an authorization to the client device 105 via Internet communication channel 115D, which can be the same as communication channel 115A. The server 110 can then receive an information request 141 for the protected resources 121 from the client device 105, based on the authorization 137, transmit the requested protected resources 121 to the client device 105.

C. System Architecture

Figure 2:
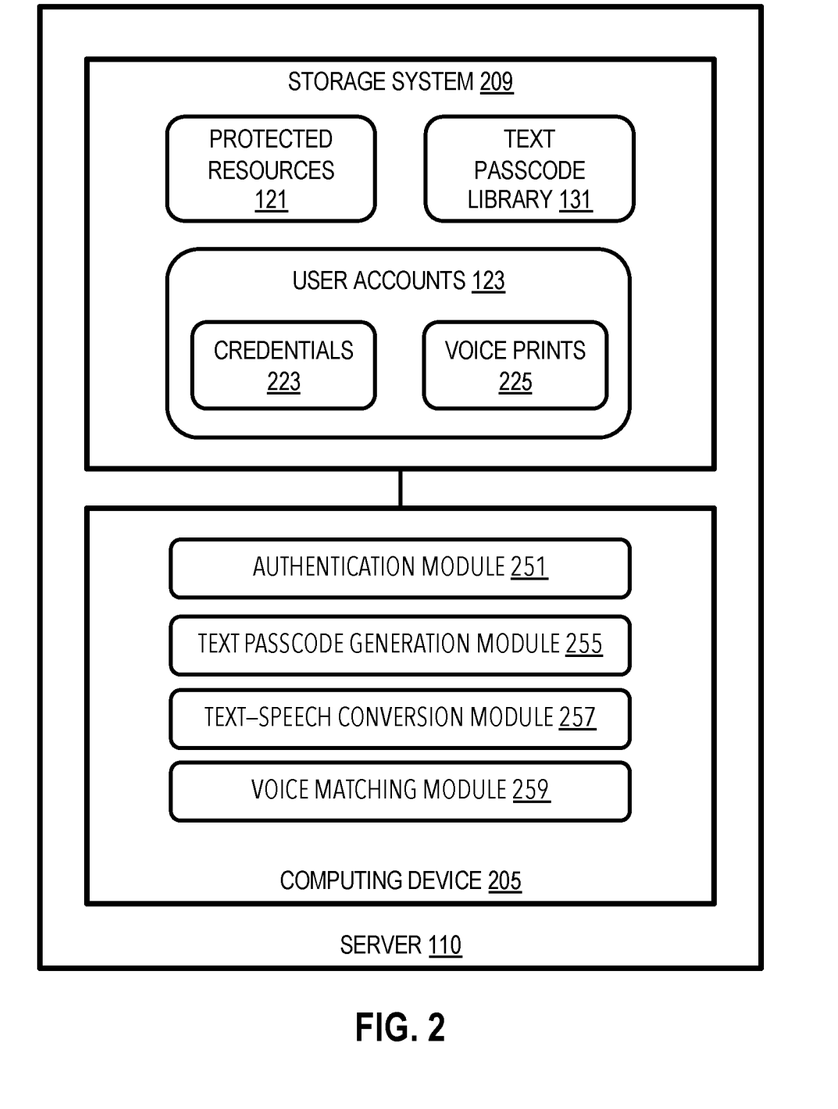
FIG. 2 illustrates a block diagram of an example system in accordance with one or more embodiments.

FIG. 2 shows a system block diagram illustrating an example of a server 110 in accordance with one or more embodiments. The server 110 can be the same or similar to that described above. The server 110 includes hardware and software that perform processes and functions disclosed herein. The server 110 can include a computing device 205 and a storage system 209. The computing device 205 can include one or more processors (e.g., microprocessor, microchip, or application-specific integrated circuit). The storage system 209 can comprise one or more non-transitory computer-readable, hardware storage devices that store information and computer-readable program instructions used by the processes and functions disclosed herein. For example, the storage system 209 can include one or more flash drives and/or hard disk drives.

Additionally, the storage system 209 can store protected resources 121, user accounts 123, and text passcode library 131, which can be the same or similar to those described above. The user accounts 123 can store copies or representations (e.g., a salted hash value) of the user credentials 223 (such as credential 125) and user voice prints 225. The voice prints 225 can be models of users' voices generated based on samples obtained from users during, for example, an enrollment process. The voice prints 225 can represent users' spoken voices based on frequency, duration, and/or amplitude. It is understood that some or all of the information stored in storage system 209 can be stored at a location remote from the server 110 (e.g., in network-accessible storage or at client devices 105).

The text passcode library 131 can include one or more dictionaries of words or textual phrases from which the server 110 can obtain or generate the codes (e.g., text passcode 120). The individual dictionaries can be populated with respective sets of words. The dictionaries can be populated with words a predefined lengths (e.g., 5 characters) excluding words that are uncommon, words that are homophones, and/or words that or difficult to distinguish from one another (e.g., words with soft phonic sounds, such as she, ch, th, wh, and ph). Some embodiments use an algorithm or a trained machine learning model to generate the words or textual phrases populating the text passcode library 131. Also, the text passcode library 131 can include dictionaries corresponding to multiple different languages, accents, or locations. Furthermore, the text passcode library 131 can include multiple dictionaries populated with words that relate to each other, such as different parts of speech. For example, the text passcode library 131 can include two dictionaries of words, wherein the first dictionary includes only adjectives, and the second dictionary includes only nouns.

The computing device 205 can execute an authentication module 251, a text passcode generation module 255, a text-speech conversion module 257, and voice matching module 259, each of which can be software, hardware, or a combination thereof. The authentication module 251 can verify credentials (e.g., credential 125) received by the server 110 are authentic based on the credentials 223 stored in the user accounts 123. Additionally, the authentication module 251 can transmit text passcodes (e.g., text passcode 129) to users and prompts (e.g., prompt 127) requesting the users respond to the prompts with the text passcodes for verification. Further, the authentication module 251 can receive prompt responses (prompt response 133) with the text passcodes returned from the users. Moreover, the authentication module 251 can verify the prompt responses and based on the successful verification, authorize access to the protected resources 121.

The text passcode generation module 255 can generate text passcodes (e.g., text passcode 129) for provision to users for authentication. One or more embodiments of the text passcode generation module 255 store the generated text passcodes in the prompt library 220 from which the authentication module 251 can select, combine, and communicate the text passcodes to clients. The text-speech conversation module 257 can convert text-to-speech for generating audio text passcodes and can convert speech-to-text for interpreting spoken text passcodes included in prompt responses. The voice matching module 259 can compare words or textual phrases received in spoken prompt responses with voice prints 225 stored in the user accounts 123 to determine whether the spoken prompt responses match a voiceprint of a user requesting authorization.

It is noted that the server 110 can comprise any general-purpose computing article of manufacture capable of executing computer program instructions installed thereon (e.g., a personal computer, server, etc.). However, server 110 is only representative of various possible equivalent-computing devices that can perform the processes described herein. To this extent, in embodiments, the functionality provided by the server 110 can be any combination of general and/or specific purpose hardware and/or computer program instructions. In each embodiment, the program instructions and hardware can be created using standard programming and engineering techniques, respectively.

The components illustrated in FIG. 2 may be implemented in software and/or hardware. Each component may be distributed over multiple applications and/or machines. For example, it is understood that some or all of the protected resources 121, the user accounts 123, and the text passcode library 131 stored in storage system 209 can be stored at a location remote from the server 110. Additionally, it is understood, that one or more of the authentication module 251, the text passcode generation module 255, the text-speech conversion module 257, and voice matching module 259, can be stored and executed remotely from the server 111. For example, the client device 105 can include a text-speech conversion module 257 that performs speech-to-text conversion of voice inputs to text for responding to authentication prompts. Additionally, multiple components may be combined into one application and/or machine. Operations described with respect to one component may instead be performed by another component.

D. Multiple Factor Authentication

Figure 3:
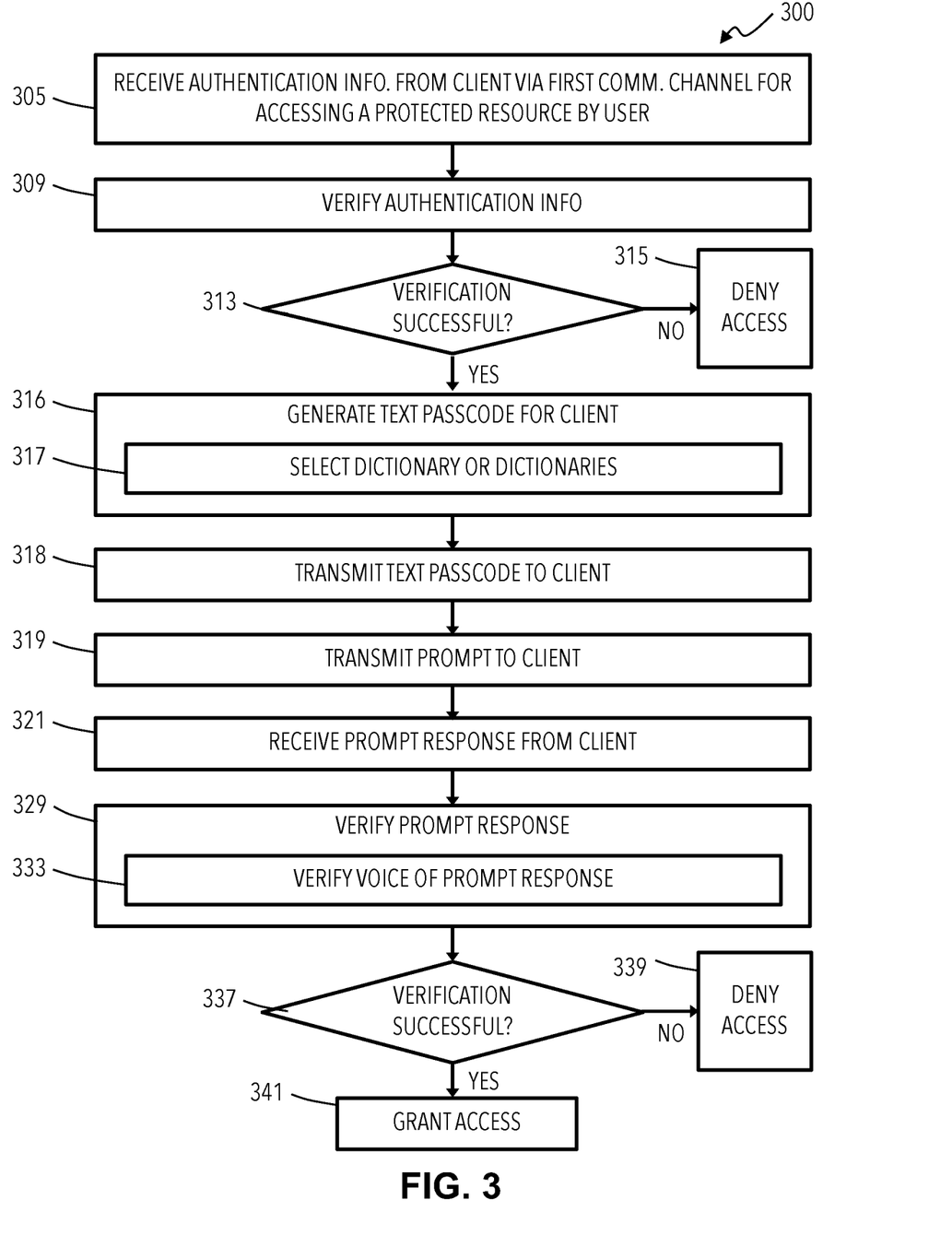
FIG. 3 illustrates a set of operations of an example process for multiple factor authentication in accordance with one or more embodiments.

The flow diagram in FIG. 3 illustrates functionality and operations of systems, devices, processes, and computer program products according to various implementations of the present disclosure. Each block in FIG. 3 can represent a module, segment, or portion of program instructions, which includes one or more computer executable instructions for implementing the illustrated functions and operations. In some implementations, the functions and/or operations illustrated in a particular block of the flow diagrams can occur out of the order shown in FIG. 3. For example, two blocks shown in succession can be executed substantially concurrently, or the blocks can sometimes be executed in the reverse order, depending upon the functionality involved. Additionally, in some implementations, the blocks of the flow diagrams can be rearranged in different orders. Further, in some implementations, the flow diagram can include fewer blocks or additional blocks. It is also noted that each block of the flow diagrams and combinations of blocks in the flow diagrams can be implemented by special-purpose hardware-based systems that perform the specified functions or acts, or combinations of special-purpose hardware and computer instructions.

FIG. 3 illustrates a set of operations of an example process 300 for multiple factor authentication of a user. As described previously, the user may attempt to access a system (e.g., server 110) to, for example, obtain one or more protected resources (e.g., protected resources 121). At block 305, the system (e.g., executing authentication module 251) can receive an authentication information (e.g., credential 125) from a user (e.g., an individual using client device 105). The system can receive the authentication information via a first communication channel (e.g., communication channel 115A), such as the Internet. The authentication information can be a unique identifier of the user, such as a username and a password, a biometric input, or the like. At block 309, the system can verify the received authentication information. For example, the system can determine that a user account (e.g., stored user accounts 123) include credential information (e.g., credentials 223) matching the authentication information received at block 305. At block 313, the system can determine whether the verification of block 309 was successful. If not (e.g., block 313 is "No"), then at block 315 the system can deny the user access to the system or the information resources protected by the system. Denying access can include communicating a message to the user indicating access was denied.

If the verification at block 309 was successful (e.g., block 313 is "Yes"), then at block 316 the system can generate a text passcode (text passcode 129) for authenticating the user. The text passcode can be a word or textual phrase. The system (e.g., executing text generation module 255) can generate the text passcode from a text passcode from a predefined library of text passcodes (e.g., text passcode library 131). As described above, the dictionaries can be populated with words or textual phrases having a predefined lengths (e.g., 5 characters). One or more embodiments generate the text passcode by selecting a first word of the text passcode from a first dictionary (e.g., "brown"), selecting a second word of the text passcode from a second dictionary of the plurality of dictionaries (e.g., "bears"), and combining the first word and the second word to form a phrase (e.g., "brown bears"). Additionally, generating the text passcode at block 316 can include, at block 317, selecting a dictionary from the library of text passcodes based on a user profile (e.g., user account 123). As described above, some embodiments include multiple dictionaries populated with words or textual phrases corresponding to different languages, accents, or locations. Information used to select a dictionary for a particular user can be included in the user profile or derived from localization information obtained from a user's device.

At block 318, the system can transmit the text passcode (e.g., text passcode 129) to the user using a communication channel different than the communication channel used at block 305. For example, the system can transmit the text passcode to the client device using a telephonic communication channel (e.g., communication channel 115B). Alternatively, using a telephone number of the user stored in the user accounts, the system can transmit a multimedia message containing text passcode in text and audio formats one of the user's client devices. The system can generate the audio of the text passcode by converting text passcode generated at block 316 into spoken words using a text-to-speech converter (e.g., text-speech conversion module 257). Additionally, the system can temporarily store a copy of the text passcode for comparison to the user's response. One or more embodiments delete the stored copy or invalidate the stored copy of the text passcode after a predetermined, limited period of time (e.g., one minute).

Additionally, at block 319, the system can transmit a prompt (e.g. prompt 127) to the client requesting the user transmit a response (e.g. prompt response 133) including the text passcode transmitted at block 317. The system can send the authentication prompt as text, as audio, or as both text and audio. The prompt can include a selectable option for the user to communicate the text passcode using a keyboard input or microphone. For example, using the communication channel used at block 305 or the communication channel used at block 317, the system can generate an interactive display user's device requesting entry of the text passcode transmitted at block 317.

At block 321, the system can receive the prompt response from the user. The content of the prompt response can be text or as audio (e.g., a spoken word or phrase), as provided by the user. For example, using the client device that received the prompt at block 319, the user can enter the text passcode transmitted at block 317 as text using a keyboard or as audio of the user's spoken voice using a microphone. Also, some embodiments of the client device convert users' spoken voice responses to text using a local speech-to-text converter. At block 329, the system can verify the text passcode received in the prompt response at block 321 by comparing the word or textual phrase received from the user to the word or textual phrase sent to the user in the text code at block 317.

One or more embodiments determine that received word or textual phrase matches or substantially matches the word or textual phrase provided in the prompt. Substantial matches may be near misses or homonyms. Near misses may be common misspellings or typographical errors. For example, as described above, the text passcode sent to the user can be the ten digit phrase: "brown bears." The response received by the system could be the exact match, "brown bears." The response by the system could also be a near miss, such as "brown bear," due to the misinterpretation by the user or by the speech-to-text conversion Additionally, the response by the system could be a common keyboard entry error where a key adjacent to a correct key is struck, such as "Briwn Bears," which may occur when a user mistrikes the "i" key adjacent to the correct "o" key. The match and near misses can be a predefined set of verifiable alternative prompt responses to a particular prompt. One or more embodiments determine the alternatives by generating a set of interpretations using alternative interpretations of the vocalized prompt generated by the text-speech module. For example, a machine learning model trained for speech recognition can generate a set of candidate alternatives for the input "brown bears," instead of a single best interpretation.

Verifying the prompt response can include, at block 333, verifying the voice of audio prompt responses received at block 321 including the user's spoken voice. Verifying the voice can include using voice matching techniques to compare the voice received at block 321 to a vocal profile included in the user account identified at block 309. At block 337, the system can determine whether the verification of block 329 was successful. If not (e.g., block 337 is "No"), then at block 339 system can deny the user access to the system or the information resources protected by the system. As above, denying access can include communicating a message to the user indicating access was denied. If the verification at block 329 was successful (e.g., block 337 is "Yes"), then at block 341 the system can authorize access to the server and/or the requested protected resource. Additionally, the system can transmit an authorization message to the user. The user can then access the system and/or the protected resource.

E. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

F. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
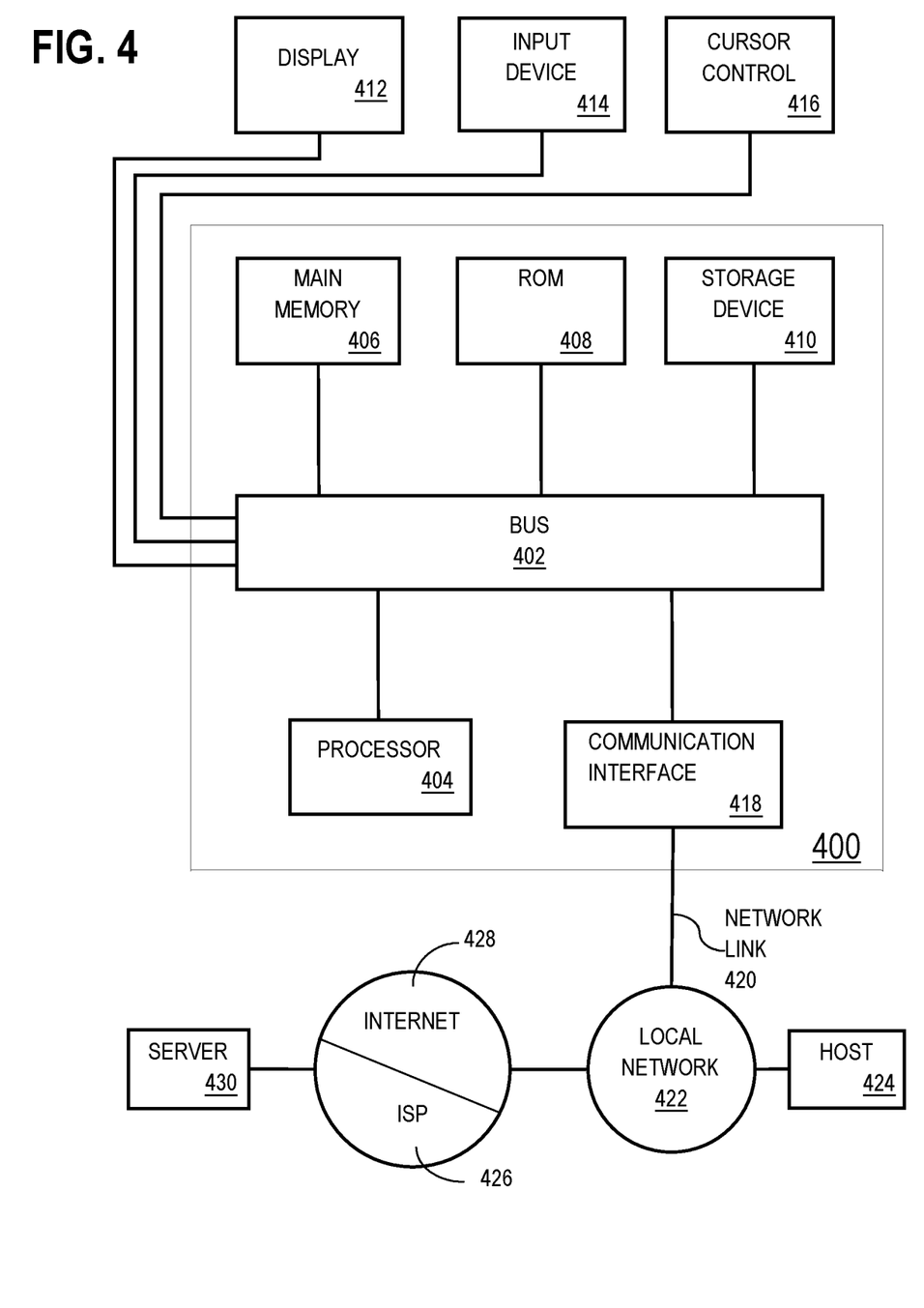
FIG. 4 shows a block diagram illustrating an example computer system in accordance with one or more embodiments.

For example, FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 enables two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the present disclosure, and what is intended by the applicants to be the scope of the claims, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   receiving, from a user via a first communication channel corresponding to the user, authentication information for authenticating the user to access a resource;
   verifying the authentication information to successfully complete a first step of an authentication process;
   selecting a text passcode for the user from a plurality of dictionaries, wherein:
      a first dictionary comprises a first set of words corresponding to a first part of speech;
      a second dictionary comprises a second set of words corresponding to a second part of speech different than the first part of speech; and
   selecting the text passcode comprises:
      selecting a first word of the text passcode from the first set of words of the first dictionary;
      selecting a second word of the text passcode from the second set of words of the second dictionary; and
      generating the text passcode using the first word and the second word;
   responsive to successfully completing the first step of the authentication process, initiating a second step of the authentication process by transmitting the text passcode to be spoken by the user;
   receiving, from the user, voice input that vocalizes the text passcode transmitted to the user;
   verifying the voice input to successfully complete the second step of the authentication process; and
   responsive to successfully completing the second step of the authentication process, granting access to the resource.

2. The non-transitory computer readable medium of claim 1, wherein the text passcode is transmitted to a user device via the first communication channel.

3. The non-transitory computer readable medium of claim 1, wherein the text passcode is transmitted to a user device via a second communication channel different than the first communication channel.

4. The non-transitory computer readable medium of claim 1, wherein the text passcode is a single-use, time-limited token.

5. The non-transitory computer readable medium of claim 1, wherein verifying the voice input comprises:
   converting the voice input to text; and
   comparing the text converted from the voice input to the text passcode transmitted to the user.

6. The non-transitory computer readable medium of claim 1, wherein verifying the voice input comprises comparing the voice input to a voice print of the user.

7. The non-transitory computer readable medium of claim 1, wherein selecting the text passcode further comprises:
   selecting the first dictionary and the second dictionary from the plurality of dictionaries based on information in a user profile.

8. The non-transitory computer readable medium of claim 1, wherein selecting the second word of the text passcode comprises:
   selecting the second word based on a relationship of the second word to the first word.

9. The non-transitory computer readable medium of claim 1, wherein:
   the first set of words corresponding to the first part of speech consist of adjectives;
   the second set of words corresponding to the second part of speech consist of nouns.

10. The non-transitory computer readable medium of claim 1, wherein:
    a first set of words comprise words having a first predefined length; and
    the second set of comprise words having a second predefined length.

11. The non-transitory computer readable medium of claim 1, wherein:
    the second set of words excludes homophones of the first set of words.

12. The non-transitory computer readable medium of claim 1, wherein:
the first set of words and the second set of words exclude words comprised of fricative consonants.

13. A computer-implemented method for authentication, the method comprising:
receiving, by a computing device from a user via a first communication channel corresponding to the user, authentication information for authenticating the user to access a resource stored by a storage system including physical memory;
verifying, by the computing device, the authentication information to successfully complete a first step of an authentication process;
selecting a text passcode for the user from a plurality of dictionaries, wherein:
a first dictionary comprises a first set of words corresponding to a first part of speech;
a second dictionary comprises a second set of words corresponding to a second part of speech different than the first part of speech; and
selecting the text passcode comprises:
selecting a first word of the text passcode from the first set of words of the first dictionary;
selecting a second word of the text passcode from the second set of words of the second dictionary; and
generating the text passcode using the first word and the second word;
responsive to successfully completing the first step of the authentication process, initiating, by the computing device, a second step of the authentication process by transmitting the text passcode to be spoken by the user;
receiving, by the computing device from the user, voice input that vocalizes the text passcode transmitted to the user;
verifying, by the computing device, the voice input to successfully complete the second step of the authentication process; and
responsive to successfully completing the second step of the authentication process, granting, by the computing device, access to the resource at the storage system,
wherein the computer-implemented method is performed by the computing device and the computing device includes at least one hardware processor.

14. The method of claim 13, wherein the text passcode is transmitted to a user device via the first communication channel.

15. The method of claim 13, wherein the text passcode is transmitted to a user device via a second communication channel different than the first communication channel.

16. The method of claim 13, wherein the text passcode is a single-use, time-limited token.

17. The method of claim 13, wherein verifying the voice input comprises:
converting the voice input to text; and
comparing the text converted from the voice input to the text passcode transmitted to the user.

18. The method of claim 13, wherein verifying the voice input comprises comparing the voice input to a voice print of the user.

19. The method of claim 13, wherein selecting the text passcode further comprises:
selecting the first dictionary and the second dictionary from the plurality of dictionaries based on information in a user profile.

20. A system comprising:
at least one device including a hardware processor
a non-transitory computer-readable storage device storing program instruction that, when executed by the hardware processor, configure the system to perform operations comprising:
receiving, from a user via a first communication channel corresponding to the user, authentication information for authenticating the user to access a resource;
verifying the authentication information to successfully complete a first step of an authentication process;
selecting a text passcode for the user from a plurality of dictionaries, wherein:
a first dictionary comprises a first set of words corresponding to a first part of speech;
a second dictionary comprises a second set of words corresponding to a second part of speech different than the first part of speech; and
selecting the text passcode comprises:
selecting a first word of the text passcode from the first set of words of the first dictionary;
selecting a second word of the text passcode from the second set of words of the second dictionary; and
generating the text passcode using the first word and the second word;
responsive to successfully completing the first step of the authentication process, initiating a second step of the authentication process by transmitting the text passcode to be spoken by the user;
receiving, from the user, voice input that vocalizes the text passcode transmitted to the user;
verifying the voice input to successfully complete the second step of the authentication process; and
responsive to successfully completing the second step of the authentication process, granting access to the resource.

* * * * *